United States Patent [19]

Amano et al.

[11] Patent Number: 4,586,160
[45] Date of Patent: Apr. 29, 1986

[54] METHOD AND APPARATUS FOR ANALYZING THE SYNTACTIC STRUCTURE OF A SENTENCE

[75] Inventors: Shin-ya Amano; Hideki Hirakawa, both of Yokohama, Japan

[73] Assignee: Tokyo Shibaura Denki Kabushiki Kaisha, Kawasaki, Japan

[21] Appl. No.: 482,195

[22] Filed: Apr. 5, 1983

[30] Foreign Application Priority Data

Apr. 7, 1982 [JP] Japan ................... 57-57920

[51] Int. Cl.⁴ .................... G06F 15/38; G10L 1/00
[52] U.S. Cl. ........................... 364/900; 364/419
[58] Field of Search ... 364/200 MS File, 900 MS File, 364/419, 513.5; 381/51, 44

[56] References Cited

U.S. PATENT DOCUMENTS

| | | | |
|---|---|---|---|
| 3,704,345 | 11/1972 | Coker et al. | 381/44 |
| 4,156,868 | 5/1979 | Levinson | 340/146.3 |
| 4,278,838 | 7/1981 | Antonov | 381/52 |
| 4,373,192 | 2/1983 | Yanagiuchi et al. | 364/900 |
| 4,393,460 | 7/1983 | Masuzawa | 364/900 |
| 4,420,817 | 12/1983 | Yoshida | 364/900 |
| 4,502,128 | 2/1985 | Okajima et al. | 364/900 |
| 4,503,426 | 3/1985 | Mikulski | 340/711 |
| 4,542,478 | 9/1985 | Hashimoto et al. | 364/900 |

FOREIGN PATENT DOCUMENTS

1596411 8/1981 United Kingdom ............... 364/900

OTHER PUBLICATIONS

Proceedings of the International Conference on Information Processing, UNESCO, Jun. 15th-20th, 1959, pp. 194-199, Paris France; "English-Japanese Machine Translation".

Abstracts of IECE Transaction, vol. 58, No. 12, Dec. 1972, pp. 45-46, Tokyo, Japan; "The Use & Effects of Linguistic Knowledges in a Speech Recognition System".

Automation and Remote Control, vol. 36, No. 8II, Aug. 1975, pp. 1303-1308, New York, U.S.A.; "Syntax-Analysis Implementation in an Associative Parallel Processor".

*Primary Examiner*—James D. Thomas
*Assistant Examiner*—A. Williams
*Attorney, Agent, or Firm*—Oblon, Fisher, Spivak, McClelland & Maier

[57] ABSTRACT

An automatic syntax analyzing method is applied to a natural language processing system. It includes the step of detecting by dictionary consultation the syntactic category of words forming an inputted sentence and steps of assumptively applying, when the input sentence includes at least a word unregistered in the dictionary section, an adequate category which satisfies a predetermined grammatical regulation of the input sentence to the unregistered word independent of the dictionary consultation.

9 Claims, 4 Drawing Figures

F I G. 1
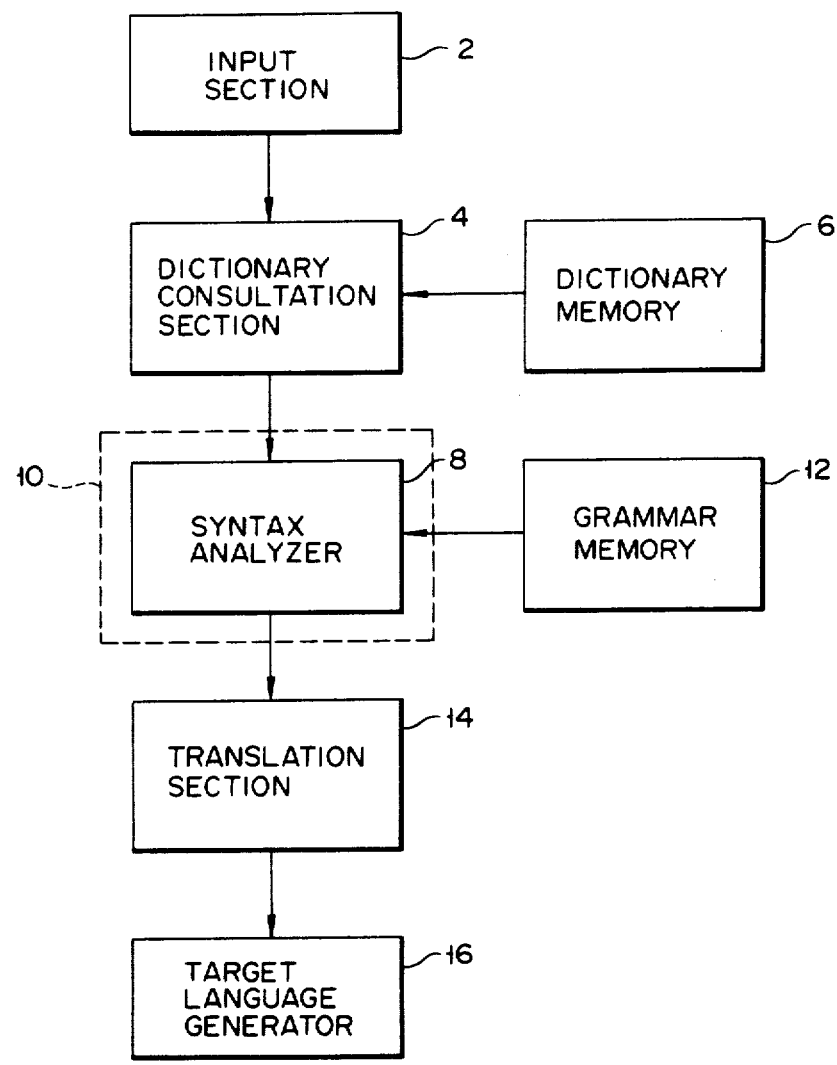

METHOD AND APPARATUS FOR ANALYZING THE SYNTACTIC STRUCTURE OF A SENTENCE

BACKGROUND OF THE INVENTION

The present invention relates to a syntax analyzing system and, more particularly, to a method and apparatus for analyzing the syntax of a natural language which is applied and inputted to a natural language processing system including a computerized translation system.

A computerized natural language-processing system, such as a machine translation system or computerized translation system, has been recently developed. In such a language processing system, a sentence input to a machine has been automatically analyzed using the syntax of an English system and an output document has been formed and edited in accordance with the analyzed result.

When the syntax analysis of the original sentence input to the machine is performed, the syntactic category of each word forming the input sentence is generally obtained by using a dictionary memory. The dictionary memory stores in advance definitions of numerous words and their syntactic categories, such as nouns, verbs, prepositions and the like. The syntatic analysis of the input sentence is processed based on the syntactic category thus obtained from all of the words included in the input sentence and the rules of grammar.

However, it is generally impossible to register in advance all of the words which may be needed to form a sentence in the dictionary of the machine. When a word unregistered in the dictionary is, accordingly, included in the sentence input to the machine, it cannot determine the syntatic category of the word. Therefore, it becomes impossible to perform the actual syntactic analysis of the input sentence. Consequently, the fact that the processing of such a sentence is interrupted and cannot be continued is a drawback of the conventional natural language-processing system.

SUMMARY OF THE INVENTION

It is an object of the present invention to provide a new and improved syntax analyzing method and apparatus capable of performing the syntactic analysis of an input sentence, even when the input sentence includes words unregistered in a dictionary, and which can prevent the interruption of language processing.

According to the present invention, the dictionary words corresponding to a plurality of words (input words) arranged in accordance with predetermined grammar rules are respectively retrieved according to a dictionary consulation when a natural language sentence, formed of the input words is input. When the dictionary word corresponding to the input word is registered in advance in a dictionary section, a syntactic category belonging to the dictionary word is applied to the input word. When words unregistered in the dictionary section are included in the input sentence, the application of the syntactic category based on dictionary consultation fundamentally becomes impossible. In this case, the unregistered word is compared with the unregistered word in the input sentence by assuming from the category data prepared in advance and it is analyzed, whether the unregistered word satisfies the grammar rules or not. In this manner, even if unknown words are included in the input sentence, the syntactic analysis of the input sentence can be continued.

BRIEF DESCRIPTION OF THE DRAWINGS

The present invention is best understood with reference to the accompanying drawings, in which:

FIG. 1 is a block diagram schematically showing the construction of the essential part of a computerized automatic translation machine preferably applied with the present invention;

DETAILED DESCRIPTION OF THE PREFERRED EMBODIMENT

Figure 2:
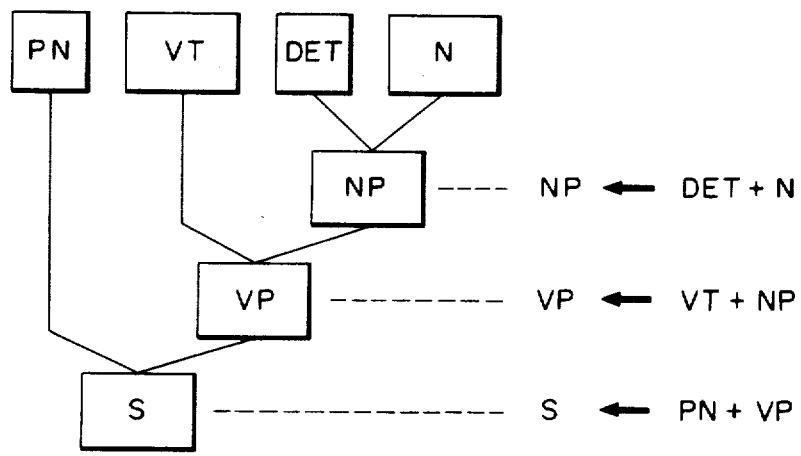
FIG. 2 is a model diagram for describing a syntax analyzing method, in accordance with one preferred embodiment of the present invention, performed on a sample input sentence applied to the input section of an automatic translation machine as shown in FIG. 1, in which the simple input sentence is constructed only with words registered in the dictionary memory of FIG. 1.

Referring now to FIG. 1, there is schematically illustrated a computerized natural language-translation system for automatically translating the English language input into a given target language, such as the Japanese language, which system is preferably applied to the present invention. An input section 2 which receives an input language source is connected to a dictionary consultation section 4. This section 4 analyzes the input language into words and consults dictionary information stored in advance in a dictionary memory 6, so as to obtain the corresponding meaning in the above target language for every word and the syntactic category. The memory 6 stores the comparison of the meanings between the input language and the target language and syntactic category data on the input language, such as noun, verb, preposition and the like, in a format corresponding to an ordinary dictionary format. The dictionary consulation section 4 is connected to a syntax analyzer 8 provided in a language processing section 10. A language grammar memory 12 is connected to the analyzer 8. This memory 12 stores rules of grammar. The analyzer 8 is connected to a translation section 14. This section 14 automatically converts an input language into an expression compatible with the target language. The translated result thus obtained in the section 14 is outputted through a target language generator 16.

The case wherein an input sentence such as "I READ A BOOK", which is shown in FIG. 2, is input to the section 2 in FIG. 1, may now be described. In this case, the input sentence information is transferred to the section 4 in which the information is decomposed into five parts, i.e., the first part "I", the second part "READ", the third part "A", the fourth part "BOOK" and the fifth part ".(punctuation mark)". Regarding the above four words, the syntactic categories are obtained by the dictionary consulation of the memory 6. When the four words included in the above input sentence are all stored in the memory 6, the syntactic category data of

TABLE

| PARTS OF SPEECH | DATA NAME |
|---|---|
| noun | N |
| transitive verb | VT |
| intransitive verb | VI |
| adjective | ADJ |
| auxiliary verb | AUX |
| conjunction | CNJ |
| preposition | PRE |
| pronoun | PN |
| interjection | INT |
| article | DET |
| relative pronoun | RP |
| relative adjective | RA |
| interrogative pronoun | IP |
| interrogative adverb | IA |
| demonstrative adjective | DA |

Accordingly, the syntatic category data PN which expresses a pronoun is applied to the first word "I" included in the input sentence by the dictionary consultation in section 4. Similarly, the syntactic category data VT, DET and N are respectively applied to the second word "READ", the third word "A" and the fourth word "BOOK". In other words, in this case, the syntactic categories are applied to all the words in the original sentence input to section 2 by the dictionary consultation. The syntactic category information of the words forming the input sentence thus obtained is supplied to the analyzer 8.

The syntactic analysis of the input sentence will be performed as described, in accordance with the above syntactic category information and the rules of grammar stored in advance in the memory 12. According to the grammar rules stored in the grammer memory 12, the high order word unit is prepared in summary from the words forming the allowable combination, based on the relationship between the syntactic category information of the finely classified word units, and this composition of the combination is repeated, to eventually recognize the structure of sentence. Accordingly, according to the rules of grammar, the combination illustrated in the following formulae will be allowed as a representative example.

$$DET+N \rightarrow NP$$
$$DET+ADJ+N \rightarrow NP \quad (1)$$
$$VT+NP \rightarrow VP \quad (2)$$
$$PN+VP \rightarrow S \quad (3)$$

Thus, in the input sentence "I READ A BOOK.", which was input to section 2 in FIG. 2, for example, the above formula (1) is applied to the third word "A", belonging to the syntactic category data DET, and the fourth word "BOOK", belonging to the syntactic category data N. Consequently, as shown in FIG. 2, these words are combined so as to form the first upper order sentence unit NP. As a result, the relationship between the first upper order unit NP and the second word "READ" can be examined. Since the above formula (2) is applied therebetween, the first upper order sentence unit NP and the second word "READ" are combined as shown in FIG. 2, thereby forming the second upper order sentence unit VP. The syntactic category data of the remaining word and, hence, the first word "I" is PN, as described above, and satisfies the terms of the above formula (3) with reference to the second upper order sentence unit VP. Consequently, the combination of the word "I" and the second upper order sentence unit VP is allowed, thereby eventually obtaining the data S of the composition data of one sentence. Thus, the syntactic analysis of the above input sentence can be succeeded and the sentence structure can be detected.

Figure 3:
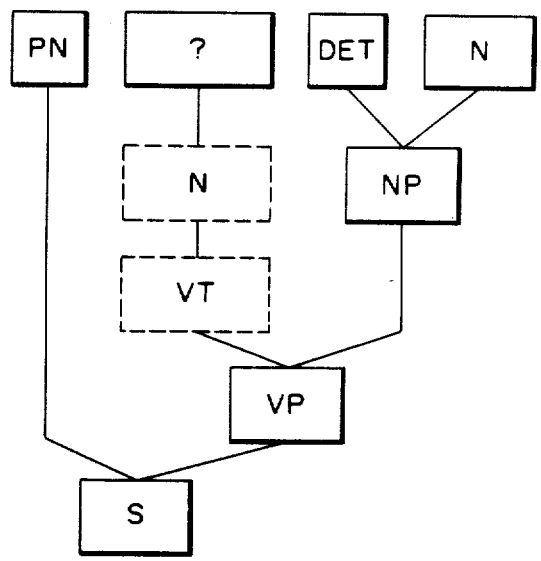
FIG. 3 is a diagram for describing a syntax analyzing method of the above embodiment of the present invention, performed with reference to another sample input sentence applied to the input section of FIG. 1, in which a other sample input sentence is constructed with the word (unknown word) unregistered in the dictionary memory shown in FIG. 1.

The case wherein another input sentence, "I THROW A BOOK.", as shown in FIG. 3, is applied to the section 2 (FIG. 1), may now be described. At this time, it is assumed that a word "THROW" included in this sentence is unregistered in the memory 6 in FIG. 1. Under such circumstances, according to the present invention, the syntactic category of the unregistered word in the dictionary is assumed to be as below.

When the dictionary consultation of the word "THROW" in the input sentence "I THROW A BOOK." fails in section 4 shown in FIG. 1 (i.e., when this word cannot be discovered in the dictionary memory 6), the syntactic category of the above unregistered word is deduced by the analyzer 8, based on the syntactic category of the other words registered in the dictionary ("I", "A" and "BOOK"). Similarly, since a combination of the words "A" and "BOOK", as registered in the dictionary, is allowed, the first order sentence unit NP can first be obtained. Then, one of the parts of speech shown in the above Table is selected for the unregistered word and is examined to see whether or not this word satisfies the rules of grammar stored in the grammar memory 12. In this case, it is preferred to try the parts of speech in the order of their frequency of use. Thus, the syntactic category data N meaning noun is first applied as the syntactic category of the unknown word in the input sentence, and the syntactic analysis is performed according to the rules of grammar.

However, in this case, there is no rules which allows this combination with the first upper order sentence unit NP. As a result, the syntactic analysis performed in this case fails. In this manner, the analyzer 8 judges that the syntactic category assumed for the unknown word "THROW" was improper.

Then, the syntactic category data VT meaning a transitive verb from the parts of speech shown in the above Table is similarly selected and applied to the unknown words. When the syntactic analysis is performed with the syntactic category data VT applied to the unknown word "THROW", the combination shown in the above formula (2) exists in the rules of grammar prestored in the grammar memory 12. Accordingly, the syntactic analysis is succeeded, thereby eventually obtaining the sentence data S. Thus, the analyzer 8 judges that the applied assumption of the above syntactic category data VT to the unknown word is correct. By way of summary, when a word unregistered in the dictionary memory 6 appears in the given original sentence, the syntactic category assumed for the word is sequentially applied, and is analyzed for its structure in each case. The syntactic analysis is repeated until a different syntactic category is applied to the unknown word and succeeds. It should be noted that a plurality of syntactic category data (N, VT, VI, ADJ, ...) expressed in the above Table as to the parts of speech are preferred to be registered in advance in a memory such as, for example, a specific memory location of memory 12.

The syntax analyzing method described above is summarized in the flowchart in FIG. 3. The computerized natural language-translation system in FIG. 1 is constructed to include a microcomputer (not shown) programmed to execute the syntax analysis shown in the flowchart in FIG. 4.

Figure 4:
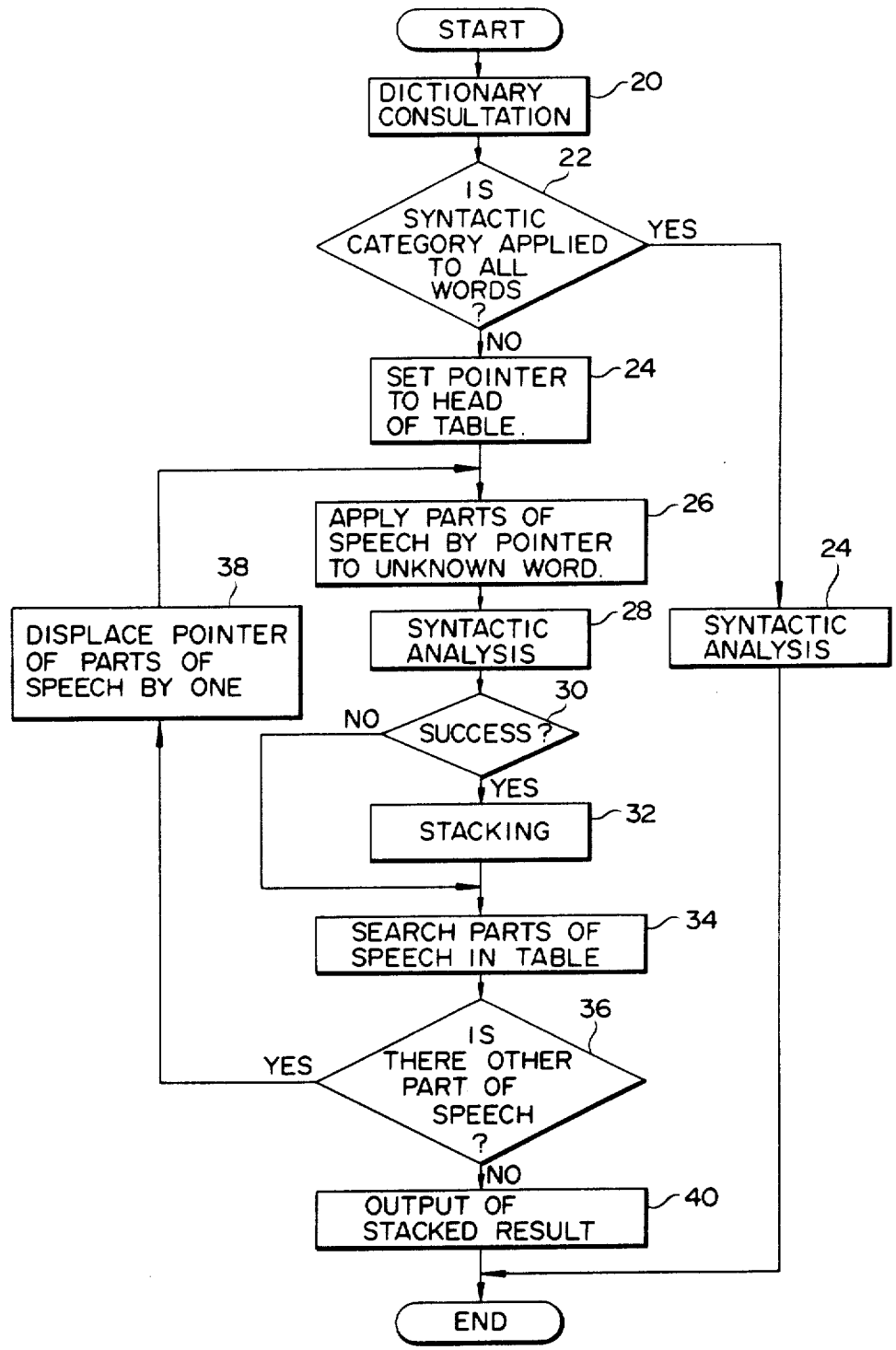
FIG. 4 is a flowchart showing the entire construction of a syntax analyzing method of the above one embodiment of the present invention.

In FIG. 4, when an original sentence (input sentence) to be analyzed is input through the input section 2, the dictionary consultation section 4 and the syntax analyzer 8 start operating and, hence, begin the syntax analyzing program. In step 20, the dictionary memory 6 which registers a number of words and their syntactic category (parts of speech) information is retrieved by the section 4 for each word forming the input sentence. After this dictionary consultation is finished, it is judged in step 22 whether syntactic categories will need to be applied to all of the words included in the input sentence, or not. When it is confirmed by this judgement that the syntactic categories are to be applied to all of the words, i.e., that the input sentence does not include the word(s) unregistered in the memory 6, the input sentence is supplied to the analyzer 8, in which the syntactic analysis is performed based on the actual arrangement relation in the sentence between the above syntactic categories and the grammatical regulations prestored in the grammar memory 12 (step 24).

On the other hand, in step 22, when an unknown word, i.e., a word for which a corresponding syntactic cateqory does not exist in the input sentence, due to the presence of an unregistered word in the dictionary, a pointer is applied to the parts of speech (syntactic category) disposed initially in the above Table (step 24). This step 24 corresponds to the step of starting to assume the syntactic category of the word(s) unregistered in the dictionary memory 6. Subsequently, in step 26, the parts of speech (syntactic category) selected by the pointer are applied to the unknown word in the input sentence and, in step 28, the confirmation of the propriety of applying the syntactic category, i.e., the syntactic analysis is performed. The analysis in step 28 is performed in a manner substantially similar to the syntax analyzing method of step 24. Thereafter, in step 30, the propriety of applying the category is judged. When the category application procedure is performed in such a way that the rules of grammar are satisfied, i.e., successfully; in step 32, the result is stacked and is transferred to step 34, which consists of searching the Table of the parts of speech. When the application (assumption) of the category does not satisfy the rules of grammar in step 30, i.e., when it fails, step 32 is directly skipped and step 34, which consists of searching the parts of speech, is performed. In step 34, the parts of speech are searched for the word in question (i.e., the word in the above Table of the category). In step 36, it is determined whether or not there are other (remaining) parts of speech in the Table, based on the search results of step 34. When there are other parts of speech in the Table, the position of the pointer in the Table is displaced by one to step 38. Subsequently, other parts of speech are read out from the Table, and the above steps 26, 28, 30, 32 and 34 are repeated. In step 36, this process is repeated until there is no remaining part of speech. In the meantime, the results of the applied categories are stacked at every juncture of the syntactic analysis.

In step 36, when it is confirmed that there is no remaining part of speech in the Table (i.e., that all parts of speech given in the Table are sequentially applied as parts of speech to be assumed for the unknown words in the input sentence and the completion of the respective syntactic analysis is confirmed), it is transferred to step 40, the successful analysis results thus stacked so far are all output, thereby completing the syntactic analysis. In this case, when a plurality of collations of the category are successful for one unknown word in the input sentence or one unregistered word in the dictionary memory 6, all of these analyzed results are output.

According to the syntax analyzing method of the present invention, as described above; even when the input sentence includes words that are not registered in the dictionary, syntactic analysis of the input sentence can be performed by assuming the syntactic category of the unknown word(s). Accordingly, when the input sentence includes even one unregistered word in the dictionary as in the conventional case, it can prevent the complete stoppage of syntactic analysis of the input sentence. In other words, it can effectively prevent the drawback resulting from an interruption of all language processing, due to the production of a state of impossible syntactic analysis, such as that created by unknown words within the input sentence. Accordingly, it can effectively and efficiently perform syntactic analysis of a sentence of wide range. Further, an increase in the capacity of the memory of the storing dictionary can be minimized and the natural language processing to be performed can be effectively executed by using the memory cells of the present capacity.

Particularly when the present invention is applied to a computerized automatic translation machine; even when the original sentence includes terms or words which are not registered in the dictionary, at least the syntactic category thereof can be effectively recognized. Consequently, the worst state to be encountered; a state wherein the translation itself is interrupted, due to production of an unknown word, and wherein continued processing becomes impossible, may be avoided.

Although the present invention has been shown and described with respect to a particular embodiment, various changes and modifications, which are obvious to a person skilled in the art to which the invention pertains, are deemed to lie within the spirit and scope of the invention.

For example, in the above embodiment, a grammar which has a rewriting regulation of the format for eventually recognizing one sentence by sequentially combining the words of the minimum unit forming a sentence and forming the upper order sentence unit has been employed. However, the present invention is not limited to the grammar of this type. For example, other types of grammar, to include augmented transition network grammar, case grammar, definite clause grammar, or the like, may be employed. Further, the output priority sequence applied when the assumed syntactic category data obtained from the Table of the parts of speech (syntactic category Table) are output may follow the sequence of words which are used frequently in the input sentence.

Moreover, the present invention has been described with respect to the computerized automatic translation system. However, the present invention is not limited to this alone. For example, the present invention may be applied widely to a computer, or the like, of the type directly inputting another natural language processing system, such as the direct input of natural language.

What we claim is:

1. A method for analyzing the syntactic structure of a sentence used as an input to a natural language processing system, said method comprising the steps of:
   receiving the input sentence formed of a plurality of input words;
   retrieving and detecting the presence of defined words among a limited number of prestored words in a dictionary section of said natural language processing system in order to assign to the input words syntactic categories which are prestored together with the prestored words in said dictionary section, said defined words respectively corresponding to the input words;

checking whether there exists among the input words any undefined words for which there are no corresponding defined words in said dictionary section; and assigning to an undefined word in the input sentence at least one syntactic category which satisfies grammar rules for the input sentence, independent of the dictionary consultation, said grammar rules being satisfied only when the syntactic categories of the input words are arranged in a predetermined pattern, thereby generating a syntactic analysis result of the input sentence;

wherein said step of assigning includes:

a step of assumptively selecting a reference syntactic category, from among a plurality of prepared reference syntactic categories, to assign said category to said undefined word included in the input sentence, said input sentence coinciding with a predetermined grammar rule;

a grammar rule analysis step of determining whether a grammatical relationship between said undefined word applied to said one reference syntactic category in the input sentence and said input words satisfies said predetermined grammar rule; and a reference category reapplication step of assumptively selecting another reference syntactic category, from among the reference syntactic categories, to reassign the category to said undefined word when said another reference syntactic category applied to said undefined word has failed to coincide with the grammar rule of said input sentence in the configuration of the syntactic categories applied to said input words by said dictionary consultation.

2. The method according to claim 1, wherein the step of assigning further comprises:

a routine step of sequentially repeating said grammar rule analysis step and said reference category reapplication step until the grammar rule analysis succeeds at least once by applying at least one reference syntactic category selected from among said reference syntactic categories applied to said undefined word.

3. The method according to claim 1, wherein said step of assigning further comprises:

a routine step of sequentially repeating said grammar rule analysis step and said reference category reapplication step, until the entire plurality of said reference syntactic categories are sequentially selected and completely assigned to said undefined word, in every instance.

4. The method according to claim 2, wherein said retrieving step comprises the steps of:

decomposing said input sentence into said plurality of input words;

consulting said dictionary section for each of said input words, to detect the defined word corresponding to each input word on a one-to-one basis; and determining, as the syntactic category of each said input words, the syntactic category belonging to each detected defined word.

5. The method according to claim 3, wherein said retrieving step comprises the steps of:

decomposing said input sentence into said plurality of input words;

consulating said dictionary section for each of said input words, to detect the defined word corresponding to each input word on a one-to-one basis; and determining, as the syntactic category of each said defined word, the syntactic category belonging to each detected input word.

6. The method according to claim 3, wherein the step of assigning further comprises:

simultaneously outputting syntactic category data to said one undefined word, N pieces of reference categories for an N number of success times, selected from said plurality of reference syntactic categories, by storing said Plurality of reference syntactic categories when said grammar rule analysis succeeds N times, where N represents a positive integer and is smaller than a plurality of numbers of prepared reference syntactic categories during execution of said routine step.

7. An apparatus for analyzing the syntactic structure of a sentence used as an input to a natural language processing system, said apparatus comprising:

dictionary memory means for prestoring a limited number of defined words, each of said defined words having a syntactic category;

input means for receiving a sentence including a plurality of input words;

dictionary consultation means connected to said input means and said dictionary memory means, for retrieving and detecting defined words respectively corresponding to the plurality of input words from among the limited number of defined words prestored in said dictionary memory means, to assign syntactic categories which are prestored with the prestored words to said input words, respectively; and means connected to said dictionary consultation means, for analyzing whether there exists at least one undefined word, other than said defined words prestored in said dictionary memory means, among the input words of said input sentence, and for assigning a syntactic category corresponding to the undefined word, independent of said dictionary consultation, when said undefined word exists in the input sentence, thereby generating a syntactic analysis result of the input sentence;

wherein said means for analyzing includes;

syntax analyzer means for assumptively selecting a reference syntactic category, from among a plurality of prepared reference syntactic categories, to assign said category to said undefined word included in the input sentence, said input sentence obeying a predetermined grammar rule, said grammar rule being satisfied only when the syntactic categories of the input words are arranged in a predetermined pattern and for determining whether or not a relationship between said undefined word assigned to said one reference syntactic category in the input sentence and said input words coincides with said predetermined grammar rule;

said syntax analyzer means further assumptively selecting another reference syntactic category, from among the reference syntactic categories, to reapply the category to said undefined word when said another reference syntactic category applied to said undefined word has failed to coincide with the grammar rule of said input sentence in the configuration of the syntactic categories applied to said input words by said dictionary consultation.

8. The apparatus according to claim 7, wherein said syntax analyzer means repeats said grammar rule analyzing operation and said reference category reapplying operation until the grammar rule analysis succeeds at least once by applying at least one reference syntactic category selected from among said reference syntactic categories applied to said undefined word.

9. The apparatus according to claim 7, wherein said syntax analyzer means sequentially repeats said grammar rule analyzing operation and said reference category reapplying operation, until the entire plurality of said reference syntactic categories are sequentially selected and completely applied to said third words, in every instance.

* * * * *